United States Patent
Ramesh et al.

(10) Patent No.: US 8,937,955 B2
(45) Date of Patent: Jan. 20, 2015

(54) SYSTEM AND METHOD FOR SCALING IPV6 ADDRESSES IN A NETWORK ENVIRONMENT

(71) Applicants: Chengelpet V. Ramesh, San Jose, CA (US); Ming Zhang, San Jose, CA (US); Shyam Kapadia, Santa Clara, CA (US); Sankararaman Jayaraman, Santa Clara, CA (US)

(72) Inventors: Chengelpet V. Ramesh, San Jose, CA (US); Ming Zhang, San Jose, CA (US); Shyam Kapadia, Santa Clara, CA (US); Sankararaman Jayaraman, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/705,273

(22) Filed: Dec. 5, 2012

(65) Prior Publication Data

US 2014/0153573 A1 Jun. 5, 2014

(51) Int. Cl.
*H04L 12/56* (2006.01)
*H04L 12/745* (2013.01)

(52) U.S. Cl.
CPC .................................. *H04L 45/748* (2013.01)
USPC .......................................... 370/392; 370/389

(58) Field of Classification Search
CPC ................................................. H04L 29/0653
USPC .................... 370/392, 401, 389, 466
See application file for complete search history.

(56) References Cited

U.S. PATENT DOCUMENTS

| | | | | |
|---|---|---|---|---|
| 6,067,574 | A * | 5/2000 | Tzeng | 709/247 |
| 6,768,739 | B1 * | 7/2004 | Kobayashi et al. | 370/392 |
| 6,888,838 | B1 * | 5/2005 | Ji et al. | 370/401 |
| 7,447,225 | B2 * | 11/2008 | Windisch et al. | 370/428 |
| 7,843,927 | B1 | 11/2010 | Grosser et al. | |
| 7,986,696 | B1 * | 7/2011 | Miliavisky et al. | 370/392 |
| 8,406,128 | B1 * | 3/2013 | Brar et al. | 370/229 |
| 2004/0123024 | A1 * | 6/2004 | King | 711/108 |
| 2004/0215609 | A1 * | 10/2004 | Takatsu et al. | 707/3 |
| 2005/0025157 | A1 * | 2/2005 | Pennec et al. | 370/395.5 |
| 2005/0041671 | A1 * | 2/2005 | Ikeda et al. | 370/395.52 |
| 2005/0041675 | A1 * | 2/2005 | Trostle et al. | 370/401 |
| 2005/0055457 | A1 * | 3/2005 | Wybenga et al. | 709/238 |
| 2005/0243818 | A1 * | 11/2005 | Foglar et al. | 370/389 |
| 2006/0114899 | A1 * | 6/2006 | Toumura et al. | 370/389 |

(Continued)

OTHER PUBLICATIONS

Li, et al., "Divide-and-Conquer: A Scheme for IPv6 Address Longest Prefix Matching," Proceedings, IEEE Workshop on High Performance Switching and Routing—HPSR, Poznan, Poland, Jun. 7-9, 2006.

*Primary Examiner* — Khaled Kassim
*Assistant Examiner* — Parth Patel
(74) *Attorney, Agent, or Firm* — Patent Capital Group

(57) ABSTRACT

An example method is provided and includes receiving, at an ingress switch in a network, a packet from an attached host that is coupled to a destination host, where the packet includes an Internet Protocol version 6 (IPv6) address of a destination host, comparing the IPv6 address with a plurality of entries in a longest prefix match (LPM) table, in which each entry includes a value string and a corresponding mask string configured to detect a match for a specific combination of a segment prefix and a switch-id in the IPv6 address, identifying an egress switch from a matching entry in the LPM table, and forwarding the packet to the egress switch. The IPv6 address includes a combination of segment prefix and switch-id associated with the egress switch. The segment prefix corresponds to an identifier of a network segment, and the switch-id corresponds to an identifier of a switch in the network.

19 Claims, 6 Drawing Sheets

(56) References Cited

U.S. PATENT DOCUMENTS

2008/0008179 A1* 1/2008 Chen et al. .................... 370/392
2008/0186968 A1* 8/2008 Farinacci et al. ............. 370/392
2010/0158010 A1* 6/2010 Kang et al. .................... 370/392
2011/0082866 A1* 4/2011 Brown .......................... 707/744
2012/0215933 A1* 8/2012 Liu ............................... 709/230

* cited by examiner

SYSTEM AND METHOD FOR SCALING IPV6 ADDRESSES IN A NETWORK ENVIRONMENT

TECHNICAL FIELD

This disclosure relates in general to the field of communications and, more particularly, to a system and a method for scaling Internet Protocol version 6 (IPv6) addresses in a network environment.

BACKGROUND

Data centers are increasingly used by enterprises for collaboration and for storing data and/or resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes receiving, at an ingress switch in a network, a packet from a directly attached host. The packet includes an Internet Protocol version 6 (IPv6) address of a destination host. The method further includes comparing the IPv6 address with a plurality of entries in a longest prefix match (LPM) table at the ingress switch, identifying an egress switch from a matching entry in the LPM table, and forwarding the packet to the egress switch. Each entry in the LPM table includes a value string and a corresponding mask string configured to detect a specific combination of a segment prefix and a switch-id in the IPv6 address. The IPv6 address includes a combination of segment prefix and switch-id associated with the egress switch. In a particular embodiment, if no match is found in the LPM table, the packet may be forwarded to a border switch and out of the network.

In specific embodiments, the method may further include receiving the packet at the egress switch, looking up a host table that includes IPv6 addresses and corresponding ports of directly attached hosts, and forwarding the packet to the IPv6 address of the destination host. If no match is found in the host table, the packet may be punted to a processor to identify the destination host.

The segment prefix may correspond to an identifier of a network segment, and the switch-id may correspond to an identifier of a switch in the network. In embodiments where a host is directly attached to a pair of switches forming an emulated switch, the switch-id may indicate an emulated switch-id of the emulated switch. The mask string may include a first portion corresponding to the segment prefix, and a second portion corresponding to the switch-id. The method may further include other features.

Example Embodiments

Figure 1:
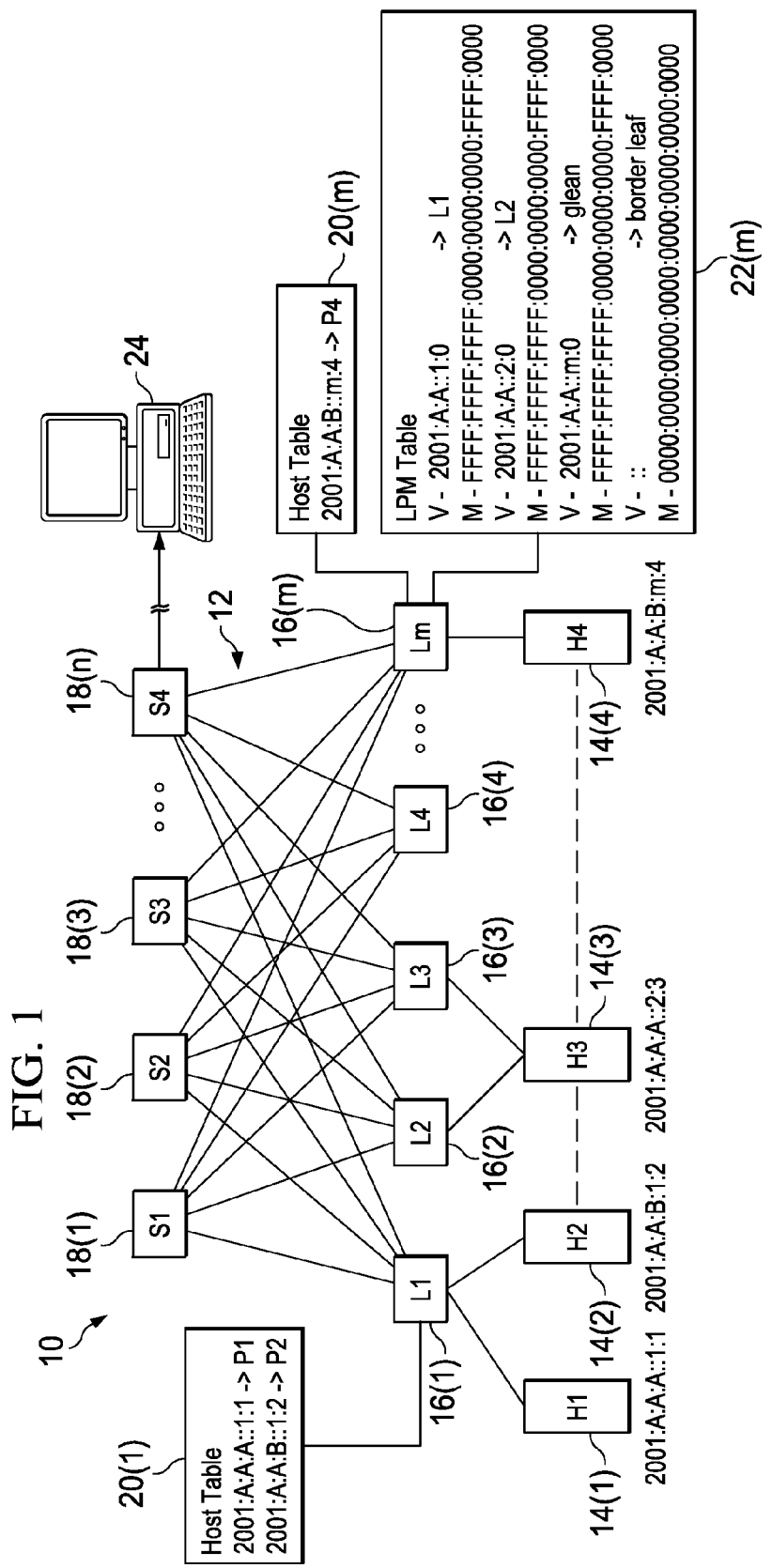
FIG. 1 is a simplified block diagram illustrating a communication system for scaling IPv6 addresses in a network environment.

Turning to FIG. 1, FIG. 1 is a simplified block diagram illustrating an embodiment of communication system 10 for scaling Internet Protocol version 6 (IPv6) addresses in a network environment. Communication system 10 includes a network 12 (generally indicated by an arrow) comprising hosts 14(1)-14(4), and a plurality of switches, including leaf switches 16(1)-16(m) and spine switches 18(1)-18(n). In various embodiments, network 12 includes overlay architecture, such as provided in Transparent Interconnect of Lots of Links (TRILL) networks, and Cisco® FabricPath.

As used herein, the term "switch" can include any network element configured to receive packets from a source (e.g., host 14(4) and forward the packets appropriately to a destination (e.g., host 14(1)) in a network (e.g., network 12). Network elements can include computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Leaf switches 16(1)-16(m) may be provisioned with respective host tables 20(1)-20(m) and longest prefix match (LPM) tables (e.g., LPM table 22(m)). Host tables 20(1)-20(m) may include associations between IPv6 addresses of directly attached hosts and corresponding ports (e.g., P1, P2, etc.) on respective leaf switches 16(1)-16(m). For example, host table 20(1) includes associations between IPv6 addresses 2001:A:A:A::1:1 and 2001:A:A:A::1:2 (corresponding to hosts 14(1) and 14(2), respectively), and ports P1 and P2 on leaf switch 16(1); host table 20(m) includes an association between IPv6 address 2001:A:A:A::m:4 (corresponding to host 14(4)), and port P4 on leaf switch 16(*m*).

LPM tables, including LPM table 22(*m*), may comprise a plurality of value (V) mask (M) pairs, comprising value strings and mask strings, For example, a value string of 2001: A:A::1:0 in LPM table 22(*m*) may indicate leaf switch 16(1) (L1), and corresponding mask string FFFF:FFFF:FFFF: 0000:0000:0000:FFFF:0000 may be configured to correspond to relevant bit values in the associated value string. The value mask pairs may be configured to detect certain IPv6 addresses in forwarding information base (FIB) tables (also called routing tables) of the leaf switches. FIB tables may be implemented in Content Addressable Memory (CAM) of leaf switches 16(1)-16(*m*). Embodiments of communication system 10 can minimize the FIB CAM utilization by intelligently masking certain bits, providing a simple approach for IPv6 scaling in massive scale data centers that does not have any restriction on the number of access switches 18(1)-18(*n*) a particular subnet spans, minimizes the LPM table usage and host table usage, and eliminates any need for a Layer 3 routing protocol.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A typical data center network may be physically collocated and under a single administrative domain. Unlike traditional enterprise networks, a majority of traffic in the data center network may be east-west (i.e., between servers within the data center) rather than north-south (i.e., between servers within the data center and the outside). In terms of server ports, data center networks can include ports numbering from 3000 ports to upwards of 100,000 ports. Data center networks are also more cost sensitive, and not as feature rich as traditional enterprise networks.

In such large data centers, server virtualization can be realized with a large number of Virtual Machines (VMs). Typically, multiple VMs share resources (e.g., processor, memory elements, storage, etc.) of a common physical server. Accompanied with expansion of services and technology improvement, the size of the data centers has increased significantly. There could be hundreds of thousands of physical servers in a single large data center, which implies that the number of VMs could be in the order of millions. Such large number of VMs imposes challenges to network equipment providers on how to effectively support millions of VMs with limited hardware resources.

A typical data center topology consists of two types of switch tiers: spine tier and leaf tier in a leaf/spine topology (or access tier and aggregation tier in an access/aggregation topology). Switches at the spine tier are generally large and expensive with many ports to interconnect multiple leaf switches together and provide fast switching between leaf switches. Switches at the leaf tier are relatively low cost, low latency, small switches that are connected to physical servers for switching traffic among local servers and remote servers (e.g., servers connected to other leaf switches through spine switches.

For increasing profit, lowering cost, and lowering latency, Application Specific Integrated Circuits (ASICs) (e.g., systems-on-chips (SOCs)) are commonly used in leaf switches. In such types of ASICs, Layer 3 LPM table size in hardware is generally restricted to a few thousand entries (e.g., 16 k to 64 k for IPv6). With IPv6 addressing, the hardware limitation can lead to a smaller capacity of storing entries. IPv6 protocol has a larger addressing space (128 bits long) than the 32 bit long addresses of IPv4 protocol. 128-bit IPv6 addresses can be generally broken down into two portions: a network prefix and an interface ID. The network prefix is typically 64 bits long. The long prefix length allows for hierarchical addressing and is recommended for better route aggregation. However, because IPv6 entries are four times longer than IPv4 entries, the effective number of LPM table entries available for IPv6 is essentially ¼th that available for IPv4. Moreover, the LPM table entries may be shared between IPv4 and IPv6, further constraining the available resources.

Generally, when a packet is received at the leaf switch, packet routing is based on the accompanying destination address string, represented by an appropriate IPv6 or IPv4 address. The address string is used as a search key in the FIB table, which contains the address string along with other pertinent details such as which leaf switch is next (next hop) in delivery of the packet to its destination address. The FIB table search process depends on the structure of the address (IPv6 or IPv4) as well as the organization of the FIB table.

Typically, the LPM table in an ASIC is generally implemented with value/mask strings corresponding to each entry. Entries in the LPM table are populated with value strings and mask strings comprising a series of bits. Value bits can be 0 or 1; the mask bits are used to include or exclude each bit in the value field when deciding if a match has occurred or not. Mask bit=T, or mask-in, indicates including the value bit and mask bit='0', or mask-out, indicates excluding the value bit. Value strings are populated according to the desired match in a suitable search key (e.g., IPv6 destination address of a packet to be forwarded). The search key may be compared against the value string and the mask string to determine if a match exists. For example, to obtain match of a /24 IPv4 subnet prefix, the values of the first 24 bits are compared against the destination address; the mask string would include 1s in the first 24 bits, and 0s in the last 8 bits in the example.

A method to scale IPv6 on large data center switches includes provisioning a switch identifier on egress switches and installing the same in hardware on ingress switches. As used herein, an "egress switch" in relation to a packet refers to the leaf (or access) switch to which the packet's destination host is directly attached; "ingress switch" in relation to the packet refers to the leaf (or access) switch that is directly attached to the source host of the packet. Millions of VMs can be supported with a limited FIB CAM size in such a scheme and may allow virtual local area networks (VLANs) to span across multiple leaf switches. Packets are switched from server to server in one switching hop (from ingress switch to egress switch directly) for optimal switching performance.

However, there is a limitation on the number VLANs with such switch identifier forwarding scheme. With a fixed number of leaf switches, the number of LPM entries scales with the number of VLANs. The maximum number of VLANs that can be included on a switch may be 4 k restricted by the VLAN identifier size (12 bits). Considering a data center with 100 switches, to support 4 k VLANs per switch, a total of 100×4000=400,000 LPM entries would be consumed for installing switch identifiers, which can be beyond the FIB CAM size of ASICs used on access switches in data centers without considering FIB CAM space for host route entries (e.g., in host tables). The number of LPM entries can be even bigger if more leaf switches are deployed in the data center.

Consequently, a solution should be provided that scales possibly independent of the number of VLANs (or subnets) per leaf switch.

Communication system 10 is configured to address these issues (and others) in offering a system and method for scaling IPv6 addresses in a network environment. Embodiments of communication system 10 may generate a segment prefix for each network segment in network 12 and a switch-id for each of leaf switches 16(1)-16(m). As used herein, the term "segment prefix" comprises an IPv6 address block allocated to a network segment. A "network segment" comprises a cluster of switches (e.g., aggregation switches, access switches, leaf switches, spine switches, etc.) for switching traffic among substantially all hosts in the cluster. Network 12 can include multiple network segments, each associated with a unique segment prefix. The segment prefix may be locally unique (e.g., unique within network 12) if the prefix is not exposed to an external network (e.g., Internet) or globally unique otherwise. As used herein, the term "switch-id" includes an identifier of a leaf switch (e.g., leaf switches 16(1)-16(m)) embedded, for example, as a 16 bit prefix in the IPv6 addresses of directly attached hosts. Switch-ids provisioned on egress switches may be propagated to ingress switches through any suitable routing or other protocol.

According to embodiments of communication system 10, a packet from a directly attached host (e.g., host 14(4)) may be received at ingress switch 16(m) (leaf switch 16(m) is termed as ingress switch to indicate that it receives the packet for forwarding on to a remote destination host, such as host 14(1); if leaf switch 16(m) were to receive a packet from remote host 14(1) destined to directly connected host 14(4), leaf switch 16(m) would be termed the egress switch). The packet may include an IPv6 address of the destination host (e.g., host 14(1)). For example, the IPv6 address may be 2001:A:A:A::1:1, corresponding to the IPv6 address of host 14(1).

Leaf switch 16(m) may compare the IPv6 address with a plurality of entries in LPM table 22(m), in which each entry includes a value string and a corresponding mask string configured to detect a match for a specific combination of a segment prefix (e.g., 2001:A:A:A) and a switch-id (e.g., 1) in the IPv6 address. For example, the LPM table entries may comprise a plurality of mask strings configured to select the segment prefixes and switch-ids from search keys (e.g., IPv6 addresses of destination hosts); the associated value strings may include specific combinations of segment prefix and switch-id corresponding to leaf switches 16(1)-16(m) in network 12, with each leaf switch associated with a unique combination of segment prefix and switch-id.

Leaf switch 16(m) may identify the relevant egress switch (e.g., leaf switch 16(1)) from a matching entry in LPM table 22(m), and forward the packet to the egress switch (e.g., leaf switch 16(1)). Leaf switch 16(1) may lookup its host table 20(1) and determine that destination IPv6 address 2001:A:A:A::1:1 corresponds to host 14(1) and may forward the packet to host 14(1) accordingly. If there is no match in the LPM table, the packet may be forwarded to a border switch (e.g., spine switch 18(n)) that connects to one or more network elements 24 outside network 12.

Embodiments of communication system 10 can generate a mask string that includes the segment prefix in a first y bits and the device prefix in a penultimate 16 bits in LPM tables (e.g., LPM table 22(m)). With the generated mask string, the number of entries in the FIB tables in any one of leaf switches 16(1)-16(m) may be restricted to the total number of leaf switches 16(1)-16(m) and border switches in network 12 according to one embodiment of communication system 10. Several hosts can be supported with a limited number of FIB CAM entries, irrespective of the number of subnets in network 12.

According to various embodiments, substantially all IP addresses in the network segment may include the same segment prefix, irrespective of the leaf switches 16(1)-16(m), or subnets associated with the hosts having the IP addresses. On the other hand, the IP addresses may have separate switch-ids, depending on the specific switch-id associated with respective one of leaf switches 16(1)-16(m) to which the host is directly attached.

Switch-ids may be generated and associated with leaf switches 16(1)-16(m) in any suitable manner. For example, in Cisco FabricPath, Layer 2 Intermediate System to Intermediate System (IS-IS) control protocol may provide a unique 12-bit switch-id to each leaf switch 16(1)-16(m) in network 12. In another example of TRILL networks, each leaf switch 16(1)-16(m) may be assigned a 16-bit unique RBridge ID that can serve as the unique switch-id. Various other schemes are possible for generating and associating switch-ids with respective leaf switches 16(1)-16(m) within the broad scope of the embodiments. In various embodiments, the host IPv6 addresses may be configured to include the segment prefix and the switch-id appropriately.

Embodiments of communication system 10 can facilitate hardware scalability through FIB CAM programming. According to an example embodiment, one entry is installed in LPM tables per destination leaf switch 16(1)-16(m), by masking in segment prefix bits and masking out all bits after segment prefix and before the switch-id bits, and masking in switch-id bits and masking out the remaining bits. For example, consider a segment prefix: 2001:000A:000A::/48 and switch-id: 0x1234. The corresponding value string in the LPM tables would comprise 2001:000A:000A:0000:0000:0000:1234:0000 and the mask string would comprise FFFF:FFFF:FFFF:0000:0000:0000:FFFF:0000. A search key in the form of an IPv6 address would be compared with the value string based on the bit positions specified in the mask string (e.g., ((IPv6 address AND mask string) AND value string), or other suitable operations) to determine if the IPv6 address matches the relevant bits of the value string. The LPM table entry can match substantially all switch-ids that include the segment prefix 2001:000A:000A::/48 and switch-id 0x1234 irrespective of the values on the bits between the segment prefix and the switch-id.

A single LPM entry for each one of leaf switches 16(1)-16(m) may be programmed in the LPM tables for substantially all packets destined to hosts connected to the leaf switch, irrespective of the subnets configured on the leaf switch. On any given leaf switch (e.g., leaf switch 16(m)), one LPM entry may be programmed in LPM table (e.g., LPM table 22(m)) for each of other leaf switches 16(1)-16(m-1) in the network segment. Rewrite information in the corresponding next-hop (or adjacency) entry may include information to forward packets to the egress switch corresponding to the switch ID in the IPv6 destination address. If a match is not found, a default action may be to forward the packet to the border switch (e.g., spine switch 18(n)) to send the packet out of network 12. Border switches generally have a much larger LPM table and contain substantially all routing information to other internal and external networks.

Entries corresponding to local hosts (e.g., hosts directly attached to the leaf switch) may also be programmed (e.g., in host table 20(m) in leaf switch 16(m) and similarly in other leaf switches). The rewrite information in the corresponding next-hop (or adjacency) entry in host tables 20(1)-20(m) may include information to punt the packet to a local processor if a match is not found. The punting may trigger an address resolution protocol if a destination host is not in the host table (e.g., the process may be equivalent to the process for a glean entry).

In some data centers having dual-homed servers, the dual-homed host may be connected to two leaf switches that together present a single emulated switch to network 12. As used herein, the term "emulated switch" can include a construct that emulates a pair of leaf switches as a single switch to the rest of the network (e.g., network 12). The emulated switch may be configured with an emulated switch-id, which may be common to both leaf switches that are part of the emulated switch. The emulated switch-id may be used in place of the switch-id in the IPv6 address of dual-homed hosts. Thus, a single prefix may be installed on remote leaf switches for packets destined to dual-homed hosts via the emulated switch.

In some embodiments, the total number of entries in any one LPM table may approximately equal the number of leaf switches in network 12. In other embodiments, the total number of entries in the LPM table may approximately equal the sum of the number of leaf switches and border switches. In yet other embodiments, the total number of entries in the LPM table may approximately equal the sum of leaf switches, emulated switches, and border switches. In a general sense, the total number of entries in the LPM table may approximately equal the number of unique switch-ids configured in IPv6 addresses of the hosts in network 12. In particular, the total number of entries in the LPM tables may be independent of the number of subnets. Together with distributed Neighbor Discovery, the control plane activities in leaf switches 16(1)-16(n) may be simplified in embodiments of communication system 10. As a result, a down time during switch reboots may also be minimized.

Embodiments of communication system 10 can provide a simple approach for IPv6 scaling in massively scalable data centers. Embodiments of communication system 10 can support millions of hosts (e.g., VMs) with limited LPM table size, reducing the FIB CAM hardware needs. Embodiments of communication system 10 can allow VLANs to span across multiple leaf switches 16(1)-16(m). Packets may be switched from host to host in one switching hop (e.g., from ingress switch to egress switch directly) for optimal switching performance. Embodiments of communication system 10 may not restrict the number of leaf switches 16(1)-16(m) a particular subnet.

The number of LPM table entries may increase in the order of the number of leaf switches 16(1)-16(m) in network 12. Embodiments of communication system 10 can allow a simplistic approach to trace a given data flow based on switch-IDs of leaf switches that the flow traverses. Embodiments of communication system 10 can support aggregation of host entries at a given leaf switch thereby minimizing the host table usage for IPv6 hosts. A tight coupling may be used between a hierarchical IPv6 address assignment and physical infrastructure to help scaling.

In embodiments where IPv6 stateless address auto-configuration is enabled in network 12, the following operations may be implemented. On a subnet, the segment prefix may be configured with a length less than or equal to 48 bits. Device prefixes may be configured for each of leaf switches 16(1)-16(m) by combining the segment prefix (and/or subnet prefix) and the 16 bit switch-id of the respective leaf switch. IPv6 Neighbor Discovery on the leaf switch can be enhanced to send a Router Advertisement (RA) packet with the device prefix instead of the subnet prefix in a prefix information option. When a host receives the RA packet, it can perform Address Auto-configuration as usual, using the device prefix appropriately. Other leaf switches that include the same VLAN, may advertise device prefixes similarly.

In some embodiments, stateful Dynamic Host Configuration Protocol version 6 (DHCPv6) may be implemented to assign host IP addresses from management systems or asset databases or similar tools. Host IP addresses can be assigned via DHCPv6 using a User Class option (e.g., as specified in Internet Engineering Task Force Request for Comments 3315). For a VLAN on a leaf switch, an IPv6 address pool may be configured in a DHCP server with a unique User Class ID for substantially all hosts (e.g., VMs) attached to the leaf switch. Substantially all addresses in the pool may share a common prefix, namely, the device prefix (comprising the segment prefix (or subnet prefix) and the switch-id).

On substantially all hosts that are connected to the leaf switch, DHCPv6 clients may be configured with the User Class ID, so that a DHCP request sent by a host may include the User Class ID that can be used by the DHCP server to match to the address pool for the corresponding leaf switch. Addresses assigned to hosts with the User Class ID can include the device prefix in the addresses assigned by the DHCPv6 server. Alternately, the device prefix information may be embedded in the vendor specific DHCP option-82 added by the leaf switch behaving as a relay, which in turn may be used for the DHCPv6 client class derivation for the appropriate subnet scope. Management systems or tools other than DHCP server can apply a similar logic to assign an IP address to a host.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Moreover, communication system 10 can include any number of spine switches, leaf switches, and servers, within the broad scope of the present disclosure.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). Network 12 may represent any type of network, including Internet, enterprise networks, cloud networks, etc.

In various embodiments, spine switches 18(1)-18(n) and leaf switches 16(1)-16(m) may include any suitable switch, router, or other network element configured to receive packets and forward packets at Layer 3 in network 12 as described herein. The term "spine" and "leaf" are used merely to distinguish between two layers of switches in the network architecture depicted in FIG. 1, and are not meant to be limitations. In a general sense, a "leaf" switch differs from a "spine" switch by being configured to anchor hosts 14(1)-14(4) thereon. Spine switches 18(1)-18(n) may be referred to as aggregation switches, and leaf switches 16(1)-16(m) may be referred to as access (or edge) switches in an access/aggregation topology. Further, leaf switches 16(1)-16(m) may include Top-Of-Rack (ToR) switches in a data center network. Hosts 14(1)-14(4) may include any suitable physical or virtual computer, server, or other network element. Moreover, the system and methods described herein may be applicable to any switch, irrespective of the particular type of switch (e.g., leaf switch, spine switch, access switch, aggregation switch, etc.).

Figure 2:
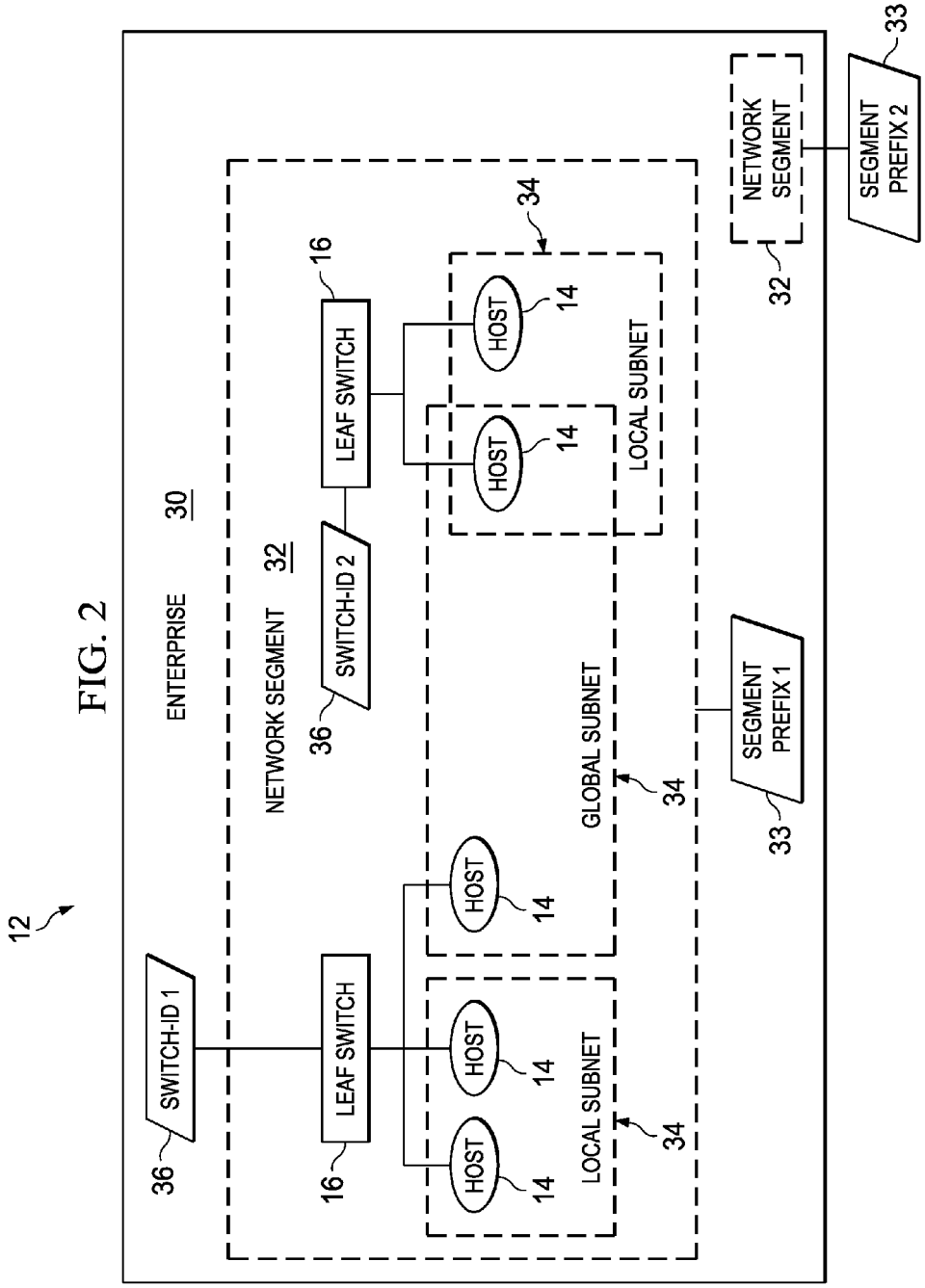
FIG. 2 is a simplified block diagram illustrating example details of the communication system in accordance with one embodiment.

Turning to FIG. 2, FIG. 2 is a simplified block diagram illustrating additional details of communication system 10. Network 12 may include an enterprise network 30. Enterprise network 30 may include one or more mutually exclusive network segments 32. Each network segment 32 may be identified by a unique segment prefix 33. For example, segment prefix 1 may identify one network segment 32 whereas segment prefix 2 may identify another network segment 32. In various embodiments, segment prefix 33 may be a string of bits, or a numerical (or alpha-numeric) value that can be represented as a string of bits (e.g., 48 bit string).

Each network segment 32 may include one or more subnet 34, including local subnets and global subnets. Substantially all hosts 14 of local subnet 34 may be directly attached to a common leaf switch 16. In global subnet 34, hosts 14 may be attached to different leaf switches 16. Some hosts 14 may be included in more than one subnet. Likewise, leaf switches 16 may be included in one or more local subnet 34 and/or global subnet 34. In a general sense, a subnet can be a type of network segment; however, several subnets may be encompassed within a network segment. Each subnet 34 may be associated with a unique subnet prefix.

In a general sense, enterprise network 12 can represent any kind of network, including a cloud, for example. In such a cloud network, network segments 32 may represent portions of the network allocated to a customer, or a function (e.g., storage), or application (e.g., web servers), etc., based on suitable needs. In another example, enterprise network 12 may represent a small business enterprise, and may include only one network segment 32. In yet another example, enterprise network 12 may represent a data center network, with a plurality of network segments 32 dedicated to different clusters (e.g., located in disparate geographic locations, assigned to different departments, allocated to different customers, etc.).

Each leaf switch 16 may be identified by a unique switch-id 36 (e.g., switch-id 1; switch-id 2; etc.). In various embodiments, switch-id 36 may include a string of bits or an alpha-numeric value that can be represented as a string of bits (e.g., 16 bit string). In some embodiments, switch-id 36 may be unique within a common network segment 32, and may be shared across different network segments. For example, a leaf switch in network segment A (not shown) may have the same switch-id as another leaf switch in another network segment B (not shown). In other embodiments, switch-id 36 may be unique within network 12.

According to various embodiments, IPv6 addresses of hosts 14 may be configured with appropriate segment prefix 33 and switch-id 36 as appropriate. Hosts 14 in a specific network segment 32 may share a common segment prefix 33 in their IPv6 addresses. Hosts 14 directly attached to a common leaf switch 16 may share switch-id 36 in their IPv6 addresses. Hosts 14 in same network segment 32 and attached to different leaf switches 16 may share segment prefix 33, but may not share switch-id 36. In various embodiments, LPM tables in leaf switches 16 may be configured with value strings and mask strings targeted at identifying a specific segment prefix and switch-id, rather than the subnet prefix.

Figure 3:
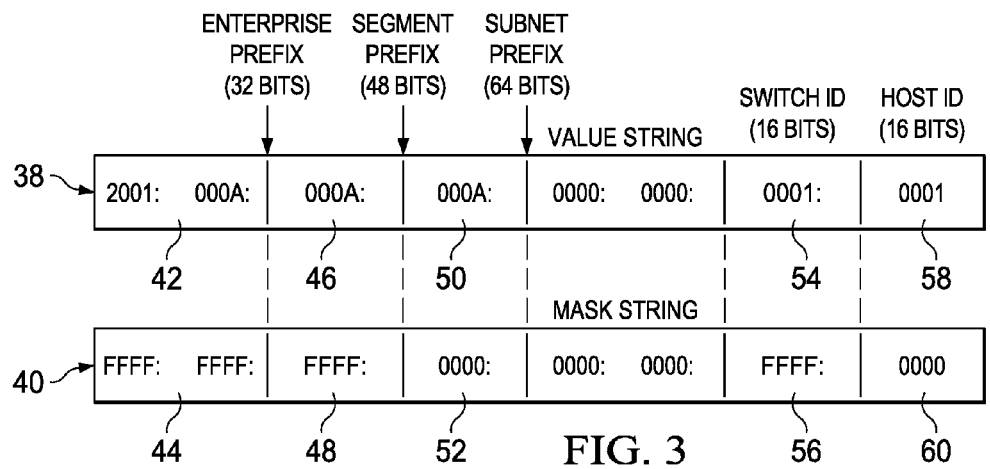
FIG. 3 is a simplified block diagram illustrating other example details of the communication system in accordance with one embodiment.

Turning to FIG. 3, FIG. 3 is a simplified block diagram illustrating an example value string 38 and mask string 40 according to embodiments of communication system 10. Value string 38 may include an enterprise prefix 42 (e.g., 2001:000A) being 32 bits long; corresponding mask bits 44 of FFFF:FFFF may indicate that values in enterprise prefix 42 may be compared with the search key (e.g., IPv6 destination address). Value string 38 may include a segment prefix 46 (e.g., 2001:000A:000A) having 48 bits (including the 32 bits of enterprise prefix 42) and corresponding mask bits 48 (FFFF:FFFF:FFFF) may indicate that values in segment prefix 46 may be compared with the search key to determine a match.

Value string 38 may include a subnet prefix 50 (e.g., 2001:000A:000A:000A) (including the 48 bits of segment prefix 46) and corresponding mask bits 52 of FFFF:FFFF:FFFF:0000, indicating that the last 16 bit values in subnet prefix 50 need not be compared with the search key (in other words, the last 16 bits of mask bits 52, corresponding to "0" in mask string 40 can be "don't cares"). Thus, subnet prefix 50 in the search key may include any values, and mask string 40 may disregard those values in performing the comparison with value string 38. Value string 38 may include a switch-id prefix 54 (e.g., 0001) and corresponding mask bits 56 (FFFF) may indicate that values in switch-id prefix 54 may be compared with the search key to determine a match. Value string 38 may include a host id 58 (0001) and corresponding mask bits 60 (0000) may indicate that values of the search key corresponding to host id 58 may be disregarded when determining a match.

Hosts 14 in enterprise network 30 may have IPv6 addresses wherein bit values corresponding to enterprise prefix 42 may be the same for all the IPv6 addresses in enterprise network 30. Bit values of the IPv6 addresses corresponding to segment prefix 46 may be different among hosts 14 depending on the specific network segment 32 associated therewith. Each leaf switch 16 may have a unique switch-id so that hosts directly attached to a specific leaf switch 16 may have the same bit values corresponding to switch-id prefix 54. A packet received into network 12, or communicated among hosts 14 of network 12 may be routed to leaf switch 16 identified from the bit values of switch-id prefix 54.

In various embodiments, switch-ids may be unique within a network segment 32, but may be duplicative in disparate network segments. Thus, the same switch-id may be shared by two different leaf switches in two different network segments 32. Because mask string 40 includes bits 48 corresponding to segment prefix 46, and bits 56 corresponding to switch-id prefix 54, a packet destined to a specific host 14 in a particular network segment 32 may be routed correctly through the appropriate leaf switch 16, even if the switch-ids are shared among leaf switches 16 in different network segments 32.

The number of bits illustrated in the FIGURE for each of enterprise prefix 42, segment prefix 46, and switch-id prefix 54 are merely for example purposes, and are not intended to be limitations in any manner whatsoever. Any number of bits may be used for each such prefix within the broad scope of the present embodiments. For example, enterprise prefix 42 may be 5 bits long, and segment prefix 46 may be 3 bits long, and vice versa. Switch-id prefix 54 may be 4 bits long in some embodiments, and 3 bits long, or 5 bits long in other embodiments. Each of the prefixes may be configured with virtually any number of bits within the 128 bits long IPv6 address within the broad scope of the embodiments.

The IPv6 addresses corresponding to such prefixes may be configured with the appropriate number of bits. For example, if the segment prefix length is 3 bits, the corresponding portion in the IPv6 address in network 12 may also be 3 bits long. Likewise, if the switch-id prefix 54 is configured as 5 bits, the corresponding portion in the IPv6 address may also be 5 bits long.

Figure 4:
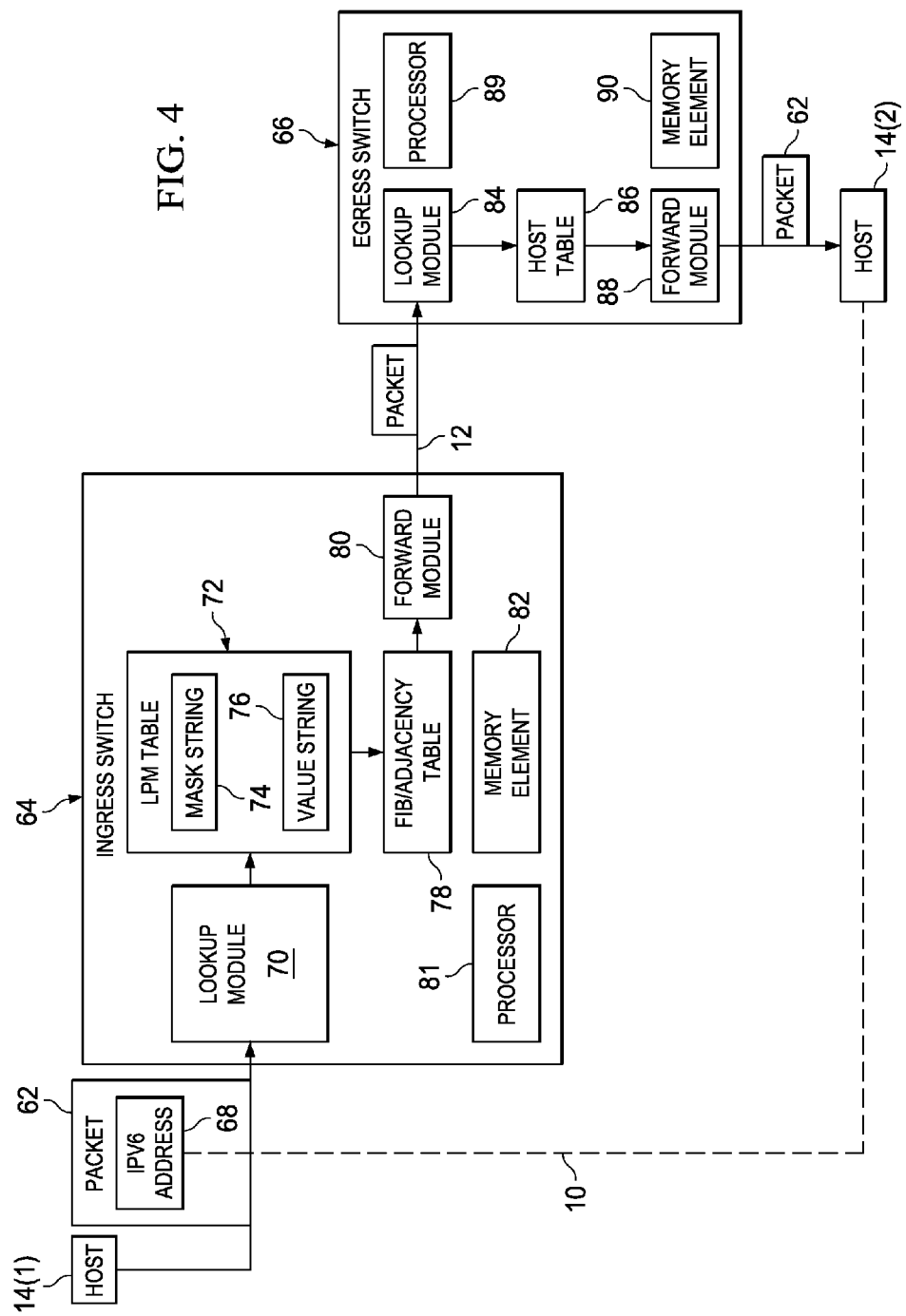
FIG. 4 is a simplified block diagram illustrating yet other example details of the communication system in accordance with one embodiment.

Turning to FIG. 4, FIG. 4 is a simplified block diagram illustrating example details of an embodiment of communication system 10. Host 14(1) may send out packet 62 destined to host 14(2) in network 12 (generally indicated by an arrow). Host 14(1) may be directly attached to ingress switch 64. Host 14(2) may be directly attached to egress switch 66. In various embodiments, ingress switch 64 and egress switch 66 may include leaf switches (e.g., leaf switch 16) in a leaf/spine network topology, or access (or edge) switches in an access/aggregation network topology. In some embodiments, ingress switch 64 and egress switch 66 may comprise ToR switches in a data center.

Packet 62 may include an IPv6 address 68 of destination host 14(2). IPv6 address 68 may include segment prefix 46 and switch-id prefix 54 populated with appropriate values corresponding to the segment prefix and switch-id associated with egress switch 66, to which host 14(2) is directly attached. Packet 62 may be received at ingress switch 64, where a lookup module 70 may lookup an LPM table 72 for destination IPv6 address 68 specified in packet 62.

LPM table 72 may include a mask string 74 that masks certain bit values in IPv6 address 68 such that the masked in values can be compared with a value string 76. In some embodiments, mask string 74 may mask out substantially all bits in IPv6 address 68 other than bits corresponding to segment prefix 46 and switch-id prefix 54. A match (e.g., bit values of IPv6 address 68 in segment prefix 46 and switch-id prefix 54 match corresponding values in value string 76) may indicate egress switch 66 to which destination host 14(2) may be directly connected. A FIB/Adjacency table 78 may be referenced to determine location of egress switch 66 and a forward module 80 may forward packet 62 to egress switch 66. A processor 81 and memory element 82 may facilitate the operations described herein.

Packet 62 may be received at egress switch 66, where another lookup module 84 may look up a host table 86 that includes IPv6 address 68 and corresponding port number of directly attached host 14(2). A forward module 88 may forward packet 62 to host 14(2) through the identified port. A processor 89 and a memory element 90 may facilitate the operations described herein.

Figure 5:
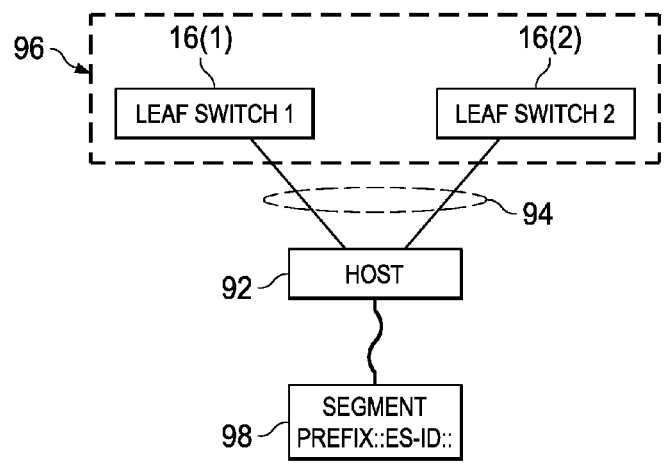
FIG. 5 is a simplified block diagram illustrating further example details of an embodiment of the communication system.

Turning to FIG. 5, FIG. 5 is a simplified block diagram illustrating example details that may be associated with a dual-homed host in network 12 according to an embodiment of communication system 10. Dual-homed host 92 may be simultaneously connected to two leaf switches 16(1) and 16(2) (e.g., leaf switch 1 and leaf switch 2) via aggregated links 94. Leaf switches 16(1) and 16(2) may together form an emulated switch 96, configured with a unique emulated switch-id (ES-ID). Dual-homed host 92 may configured with an IPv6 address 98 having the segment prefix and the ES-ID of network segment 32 and emulated switch 96 associated with host 92. The ES-ID may be used in place of the switch-id of leaf switch 16(1) or 16(2). A packet destined to dual homed host 92 may be routed to emulated switch 96 represented by leaf switches 16(1) and 16(2).

Figure 6:
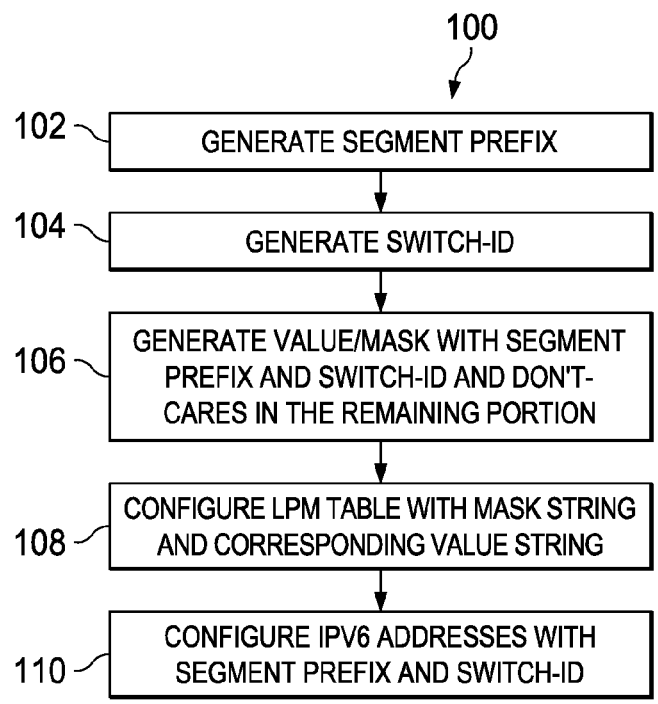
FIG. 6 is a simplified flow diagram illustrating example operational activities that may be associated with embodiments of the communication system.

Turning to FIG. 6, FIG. 6 is a simplified flow diagram illustrating example operations that may be associated with embodiments of communication system 10. Operations 100 may include 102, at which a segment prefix may be generated for each network segment 32. At 104, a switch-id may be generated for each leaf switch 16(1)-16(m), emulated switch (e.g., emulated switch 96) and border switch (e.g., spine switch 18(n)) in network 12. In some embodiments, the switch-id may be unique to each switch in network 12. In other embodiments, the switch-id may be unique within a network segment, and may share switch-ids with other switches in other network segments within network 12. In yet other embodiments, the switch-id may be unique globally, within and outside network 12.

At 106, a value/mask pair comprising value string 38 and corresponding mask string 40 may be generated. Value string 38 may include segment prefix 46 and switch-id prefix 54 in a few bits and don't cares in the remaining bits. Corresponding mask bits 48 and 56 may be "F" in hexadecimal notation to indicate that those bits in the search key may be compared against value string 38 and "0" otherwise, to indicate that those bits in the search key may be "don't cares." At 108, LPM tables 22 may be configured with mask string 40 and corresponding value string 38. At 110, IPv6 addresses of hosts 14 in network 12 may be configured suitably with appropriate bits values corresponding to segment prefix 46 and switch-id prefix 54 associated with the directly attached leaf switch 16.

Figure 7:
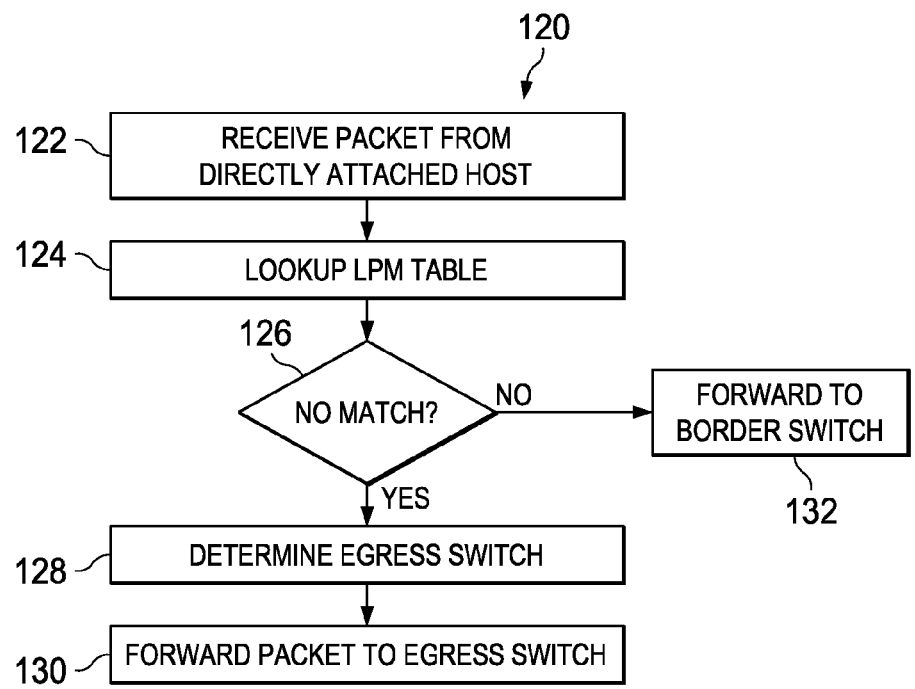
FIG. 7 is a simplified flow diagram illustrating other example operational activities that may be associated with embodiments of communication system.

Turning to FIG. 7, FIG. 7 is a simplified flow diagram illustrating example operations that may be associated with embodiments of communication system 10. Operations 120 may include 122, at which packet 62 may be received at ingress switch 64 from directly attached host 14(1). Packet 62 may include IPv6 address 68 of destination host 14(2). At 124, LPM table 72 may be looked up. Looking up LPM table 72 may comprise comparing bit values in IPV6 address 68 masked in according to mask string 74 with value string 76. At 126, a determination may be made whether a match exists. If a match exists, egress switch 66 may be determined from bit values of switch-id prefix 54 in IPv6 address 68 at 128. At 130, packet 62 may be forwarded to egress switch 66. On the other hand, if no match exists at 126, packet 62 may be forwarded to a border switch (e.g., gateway switch) to forward packet 62 out of network 12 (or the appropriate network segment).

Figure 8:
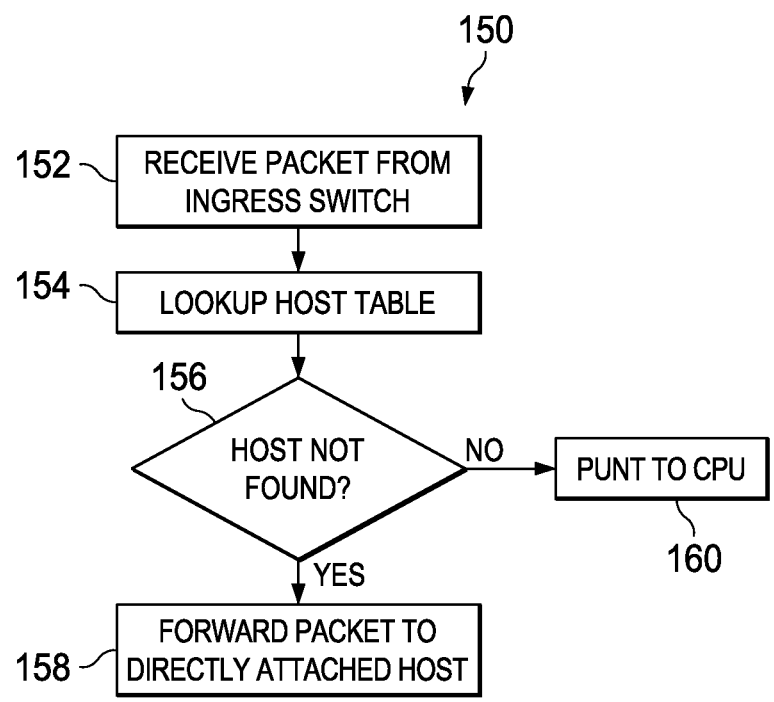
FIG. 8 is a simplified flow diagram illustrating yet other example operational activities that may be associated with embodiments of communication system.

Turning to FIG. 8, FIG. 8 is a simplified flow diagram illustrating example operations that may be associated with forwarding packet 62 to a directly attached host according to various embodiments of communication system 10. Operations 150 may include 152, at which packet 62 may be received at egress switch 66 from ingress switch 64. At 154, host table 86 may be looked up. At 156, a determination may be made whether the host IP address represented by IPv6 address 68 in packet 62 is present in host table 86. If a match is found, at 158, packet 62 may be forwarded to directly attached host 14(2) at 158. Otherwise, packet 62 may be punted to processor 89 at 160 to initiate an address resolution protocol suitably.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, leaf switch 16. In some embodiments, one or more of these features may be implemented in hardware, provided external to these elements, or consolidated in any appropriate manner to achieve the intended functionality. The various network elements (e.g., leaf switch 16) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, leaf switch 16 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 82, 90) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processors 81, 89) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving, at an ingress switch in a network, a packet from an attached host that is coupled to a destination host, wherein the packet includes an Internet Protocol version 6 (IPv6) address of the destination host, wherein an initial 48 bits of the IPv6 address indicates a segment prefix, an initial 64 bits indicates a subnet prefix, a penultimate 16 bits indicates a switch-id corresponding to an egress switch attached to the destination host, and a last 16 bits indicates a host id corresponding to the destination host;
comparing the IPv6 address with a plurality of entries in a longest prefix match (LPM) table, wherein each entry corresponds to a specific switch in the network and comprises a value string and a corresponding mask string configured to detect a match for a specific combination of the segment prefix and the switch-id in the IPv6 address, irrespective of the subnet prefix and the host id;
identifying the egress switch from a matching entry in the LPM table; and
forwarding the packet to the egress switch, wherein the egress switch forwards the packet to the attached destination host.

2. The method of claim 1, wherein the segment prefix is associated with the egress switch.

3. The method of claim 1, further comprising:
receiving the packet at the egress switch;
looking up a host table comprising IPv6 addresses and corresponding ports of directly attached hosts; and
forwarding the packet to the IPv6 address of the destination host.

4. The method of claim 1, wherein if no match is found, a destination host is identified.

5. The method of claim 1, wherein the switch-id comprises an emulated switch-id for a host connected to an emulated switch, wherein the emulated switch comprises a pair of switches connected to the host and appearing as a single switch to the network.

6. The method of claim 1, wherein if no match is found in the LPM table, the method further comprises forwarding the packet to a border switch to send the packet out of the network.

7. The method of claim 1, wherein the segment prefix corresponds to an identifier of a network segment, and the switch-id corresponds to an identifier of a switch in the network.

8. The method of claim 1, wherein the mask string comprises a first portion and a second portion, wherein the first portion corresponds to the segment prefix, and the second portion corresponds to the switch-id.

9. The method of claim 1, wherein the plurality of entries in the LPM table may be independent of subnets configured on the ingress switch.

10. Logic encoded in non-transitory media that includes instructions for execution and when executed by a processor, is operable to perform operations comprising:
receiving, at an ingress switch in a network, a packet from an attached host that is coupled to a destination host, wherein the packet includes an Internet Protocol version 6 (IPv6) address of the destination host, wherein an initial 48 bits of the IPv6 address indicates a segment prefix, an initial 64 bits indicates a subnet prefix, a penultimate 16 bits indicates a switch-id corresponding to an egress switch attached to the destination host, and a last 16 bits indicates a host id corresponding to the destination host;
comparing the IPv6 address with a plurality of entries in a longest prefix match (LPM) table, wherein each entry corresponds to a specific switch in the network and comprises a value string and a corresponding mask string configured to detect a match for a specific combination of the segment prefix and the switch-id in the IPv6 address, irrespective of the subnet prefix and the host id;
identifying the egress switch from a matching entry in the LPM table; and
forwarding the packet to the egress switch, wherein the egress switch forwards the packet to the attached destination host.

11. The logic of claim 10, wherein the segment prefix is associated with the egress switch.

12. The logic of claim 10, the operations further comprising:
receiving the packet at the egress switch;
looking up a host table comprising IPv6 addresses and corresponding ports of directly attached hosts; and
forwarding the packet to the IPv6 address of the destination host.

13. The logic of claim 10, wherein the mask string comprises a first portion and a second portion, wherein the first portion corresponds to the segment prefix, and the second portion corresponds to the switch-id.

14. The logic of claim 10, wherein the segment prefix corresponds to an identifier of a network segment, and the switch-id corresponds to an identifier of a switch in the network.

15. An apparatus, comprising:
a lookup module;
a forward module;
a memory element for storing data; and
a processor that executes instructions associated with the data, wherein the lookup module, the forward module, the processor, and the memory element cooperate such that the apparatus is configured for:
receiving, at an ingress switch in a network, a packet from an attached host that is coupled to a destination host, wherein the packet includes an Internet Protocol version 6 (IPv6) address of the destination host, wherein an initial 48 bits of the IPv6 address indicates a segment prefix, an initial 64 bits indicates a subnet prefix, a penultimate 16 bits indicates a switch-id corresponding to an egress switch attached to the destination host, and a last 16 bits indicates a host id corresponding to the destination host;
comparing the IPv6 address with a plurality of entries in a longest prefix match (LPM) table, wherein each entry corresponds to a specific switch in the network and comprises a value string and a corresponding mask string configured to detect a match for a specific combination of the segment prefix and the switch-id in the IPv6 address, irrespective of the subnet prefix and the host id;
identifying the egress switch from a matching entry in the LPM table; and
forwarding the packet to the egress switch, wherein the egress switch forwards the packet to the attached destination host.

16. The apparatus of claim 15, wherein the segment prefix is associated with the egress switch attached to the destination host.

17. The apparatus of claim 15, wherein the mask string comprises a first portion and a second portion, wherein the first portion corresponds to the segment prefix, and the second portion corresponds to the switch-id.

18. The apparatus of claim 15, wherein the segment prefix corresponds to an identifier of a network segment, and the switch-id corresponds to an identifier of a switch in the network.

19. The apparatus of claim 15, wherein the egress switch receives the packet, looks up a host table comprising IPv6 addresses and corresponding ports of directly attached hosts, and forwards the packet to the IPv6 address of the destination host.

* * * * *